Jan. 2, 1962
J. H. APEL ETAL
3,015,258
PAVING MATERIAL SPREADER
Filed Nov. 27, 1959
14 Sheets-Sheet 2
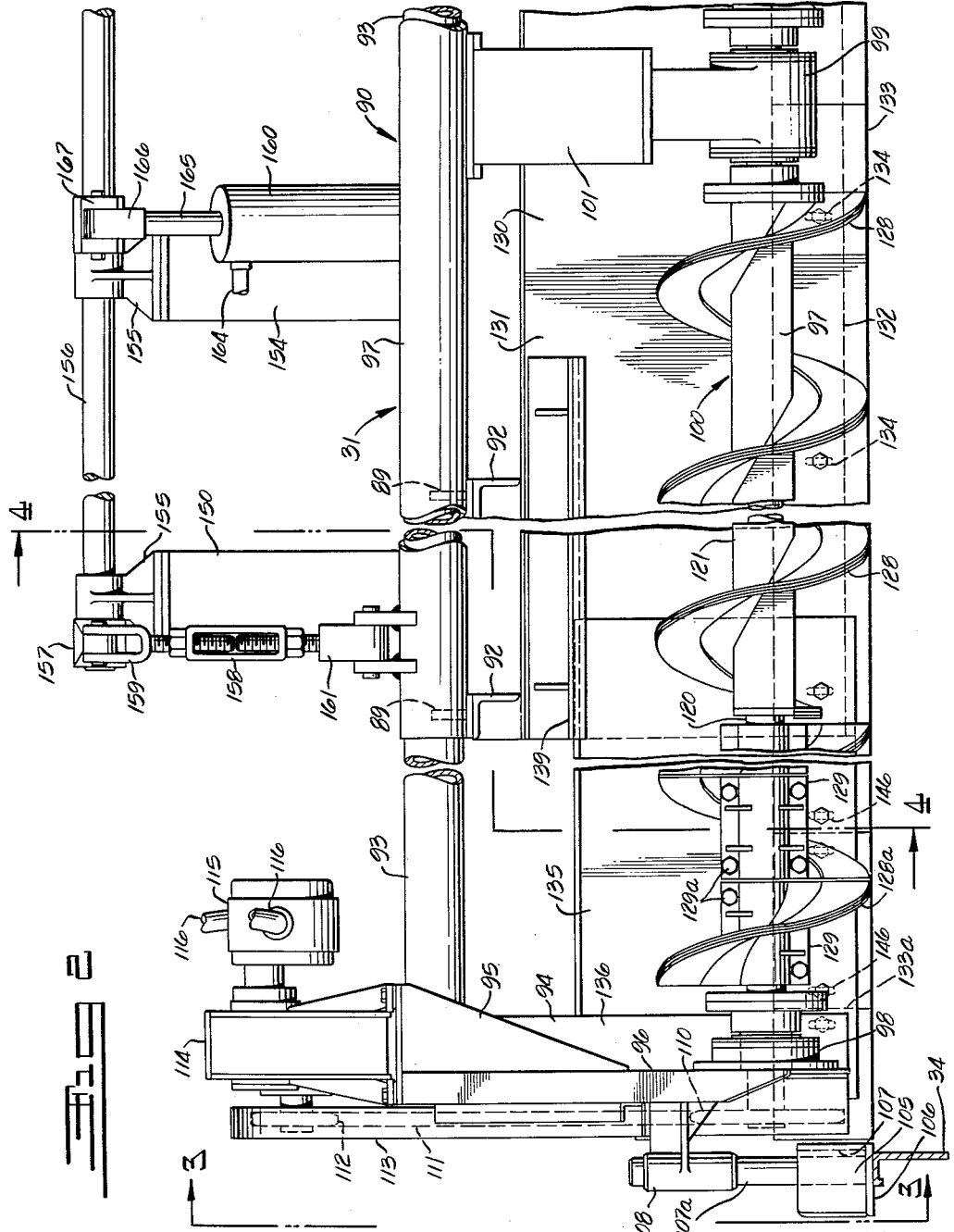
INVENTORS.
JOHN H. APEL
ROBERT J. BEESON
BY MAHONEY, MILLER & RAMBO
BY
ATTORNEYS

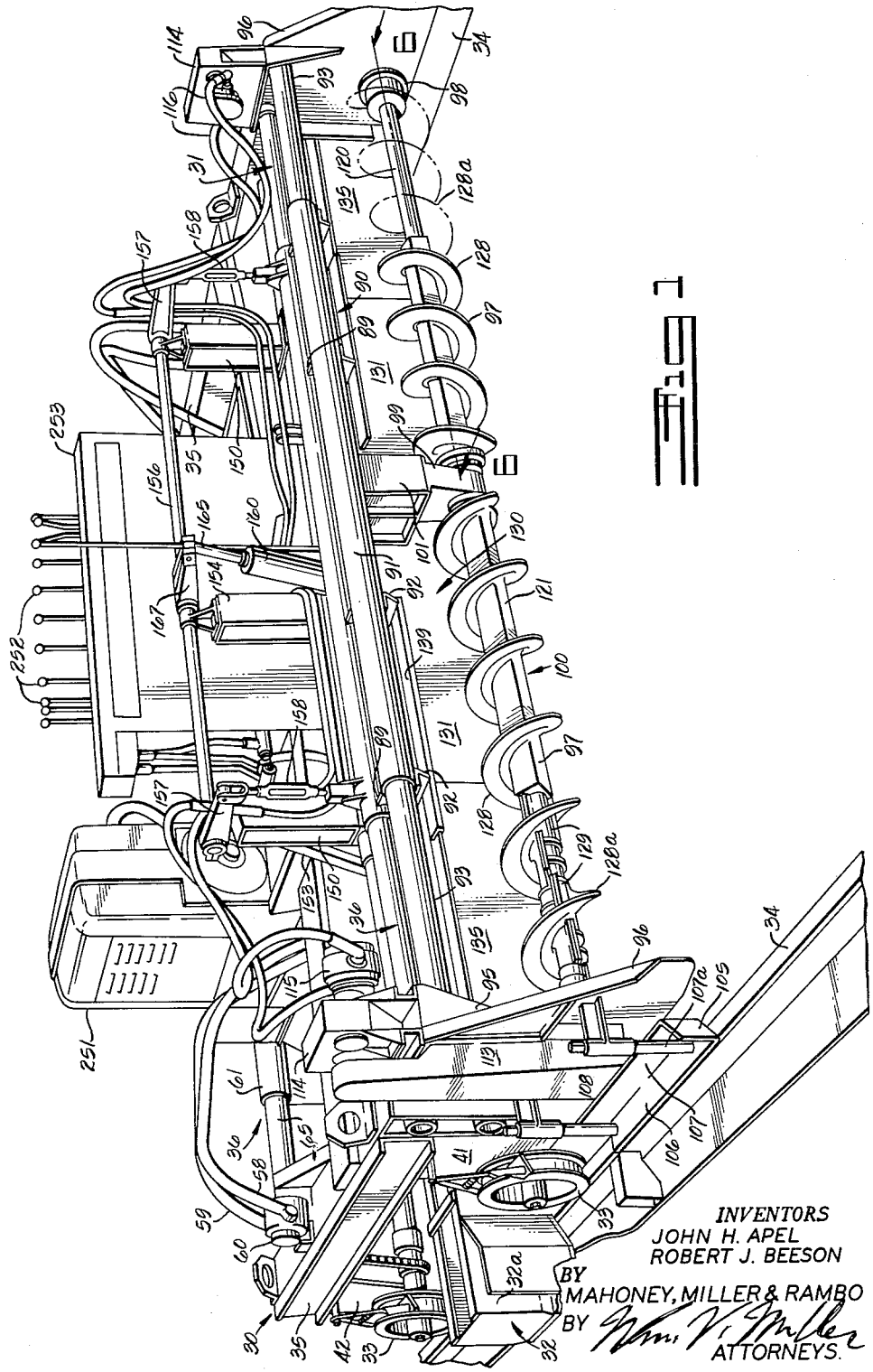

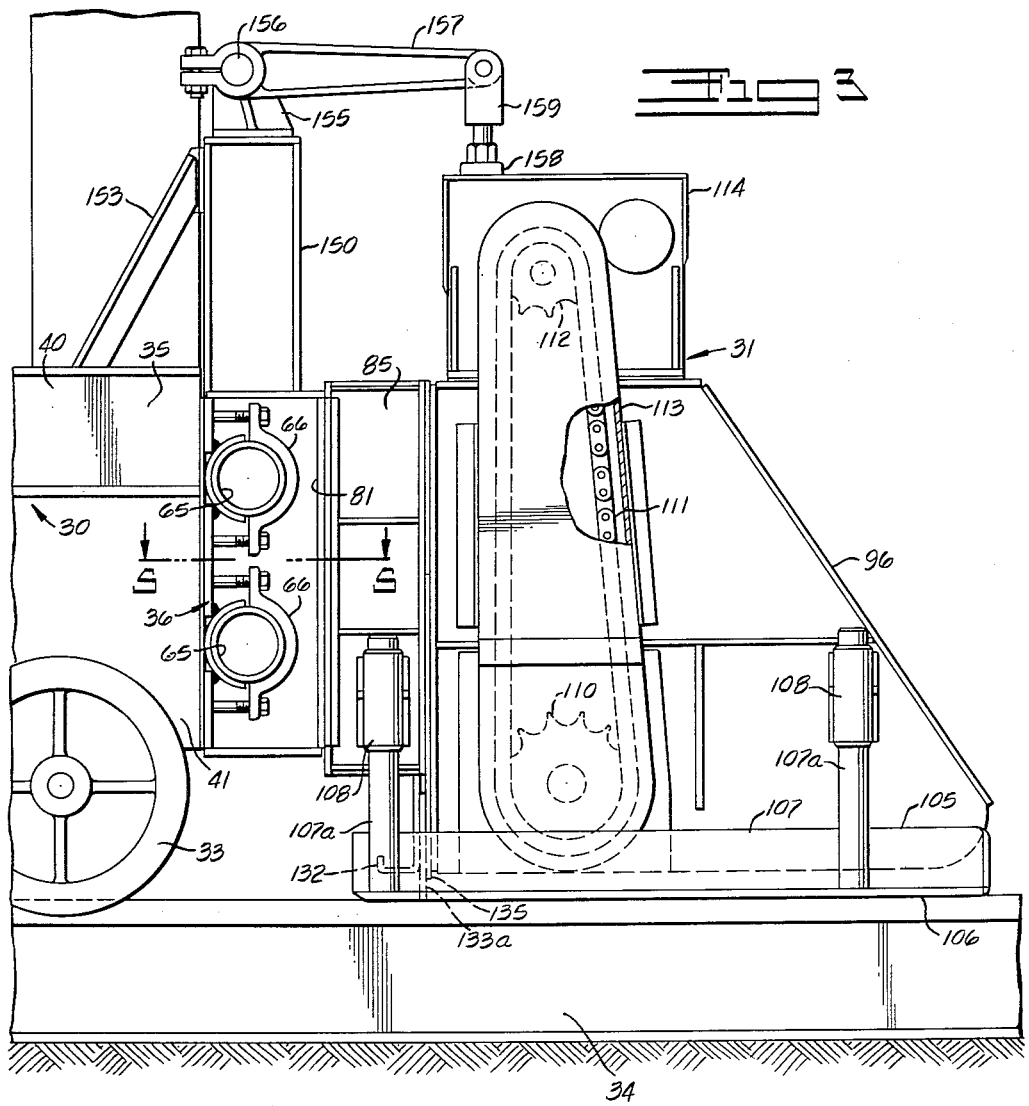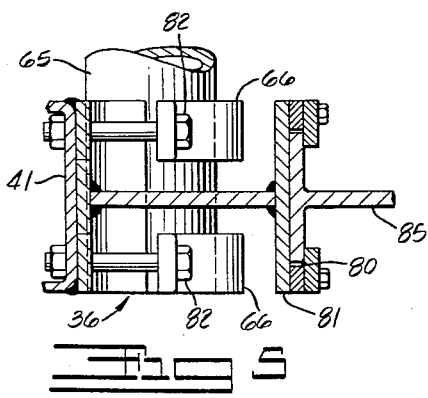

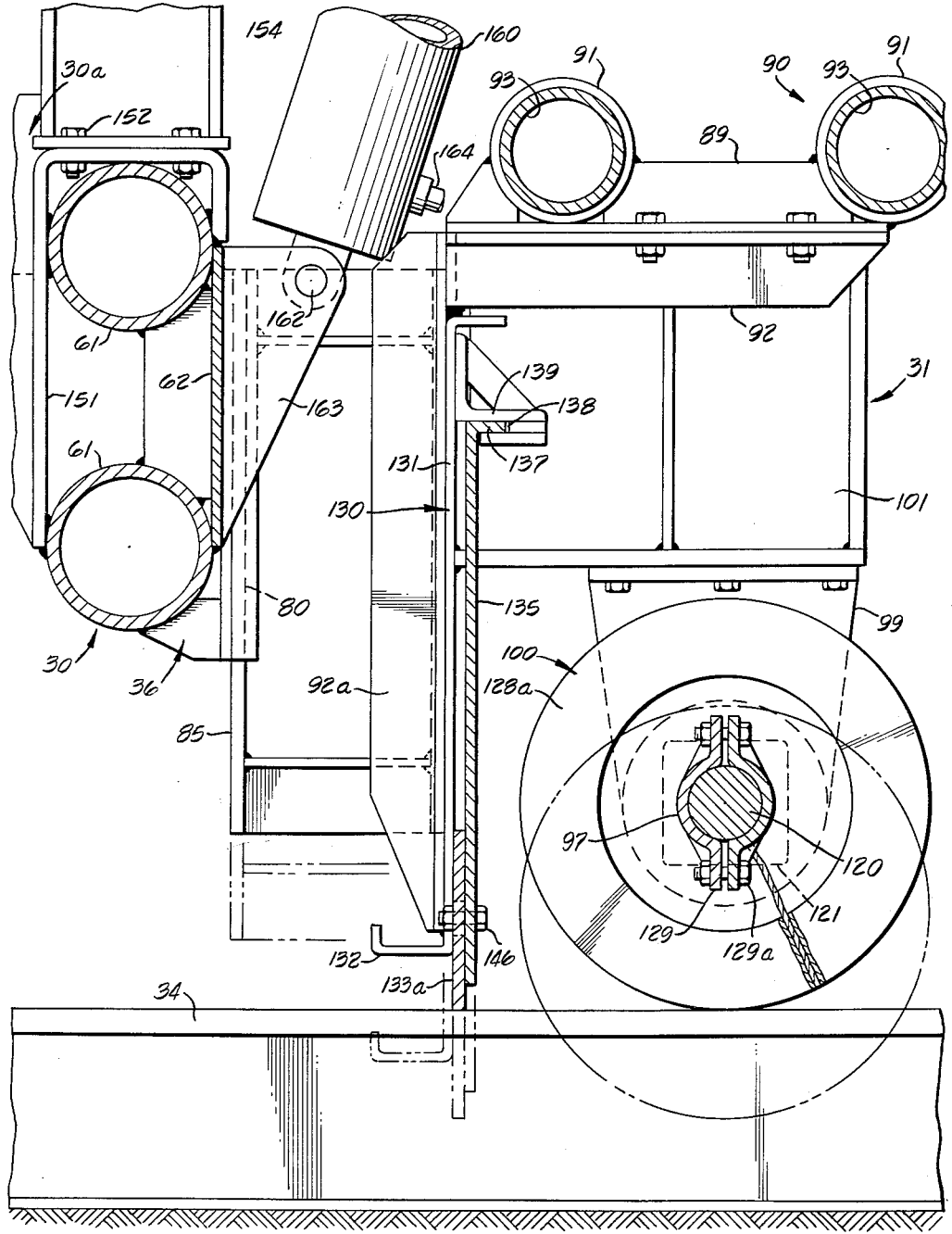

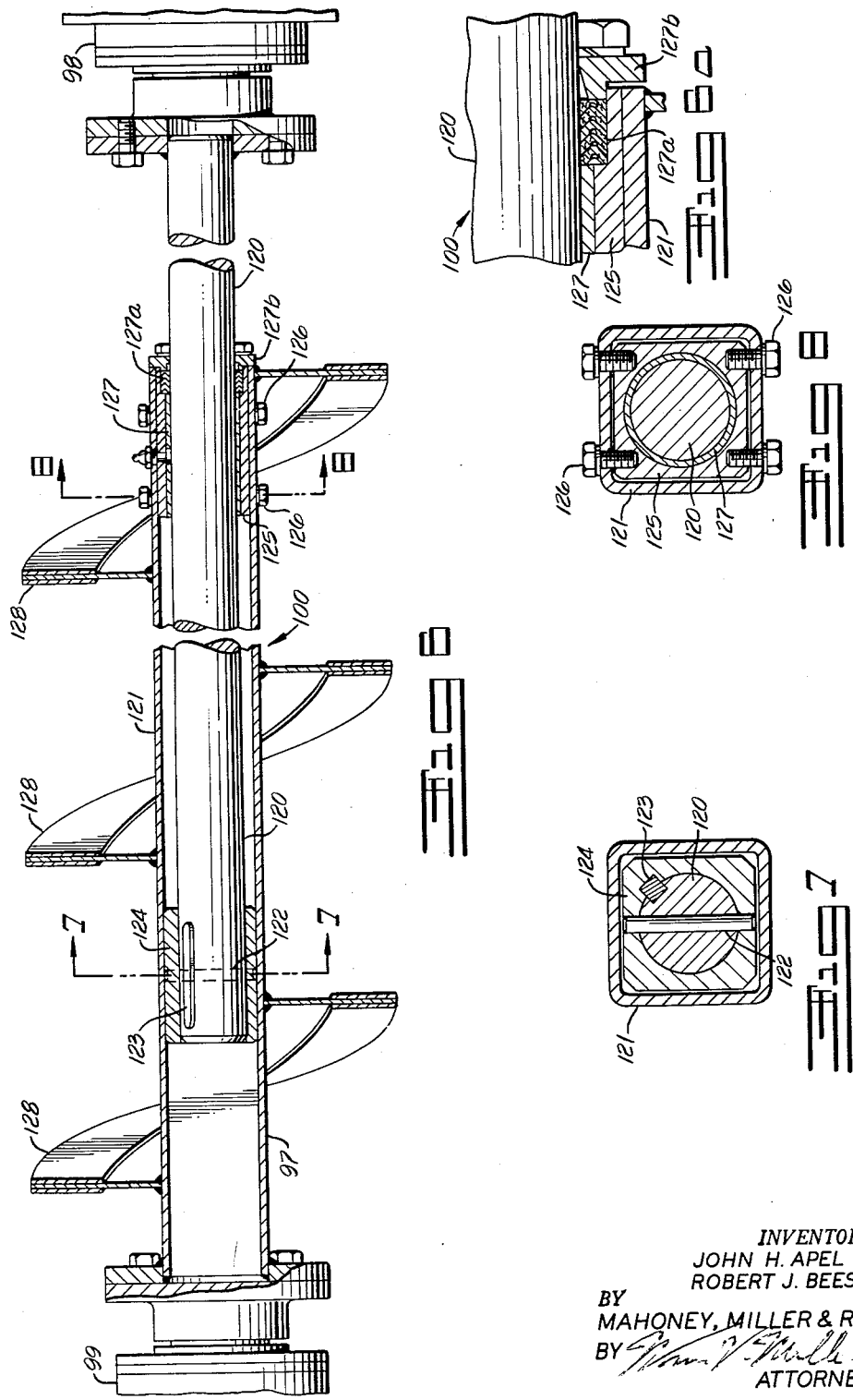

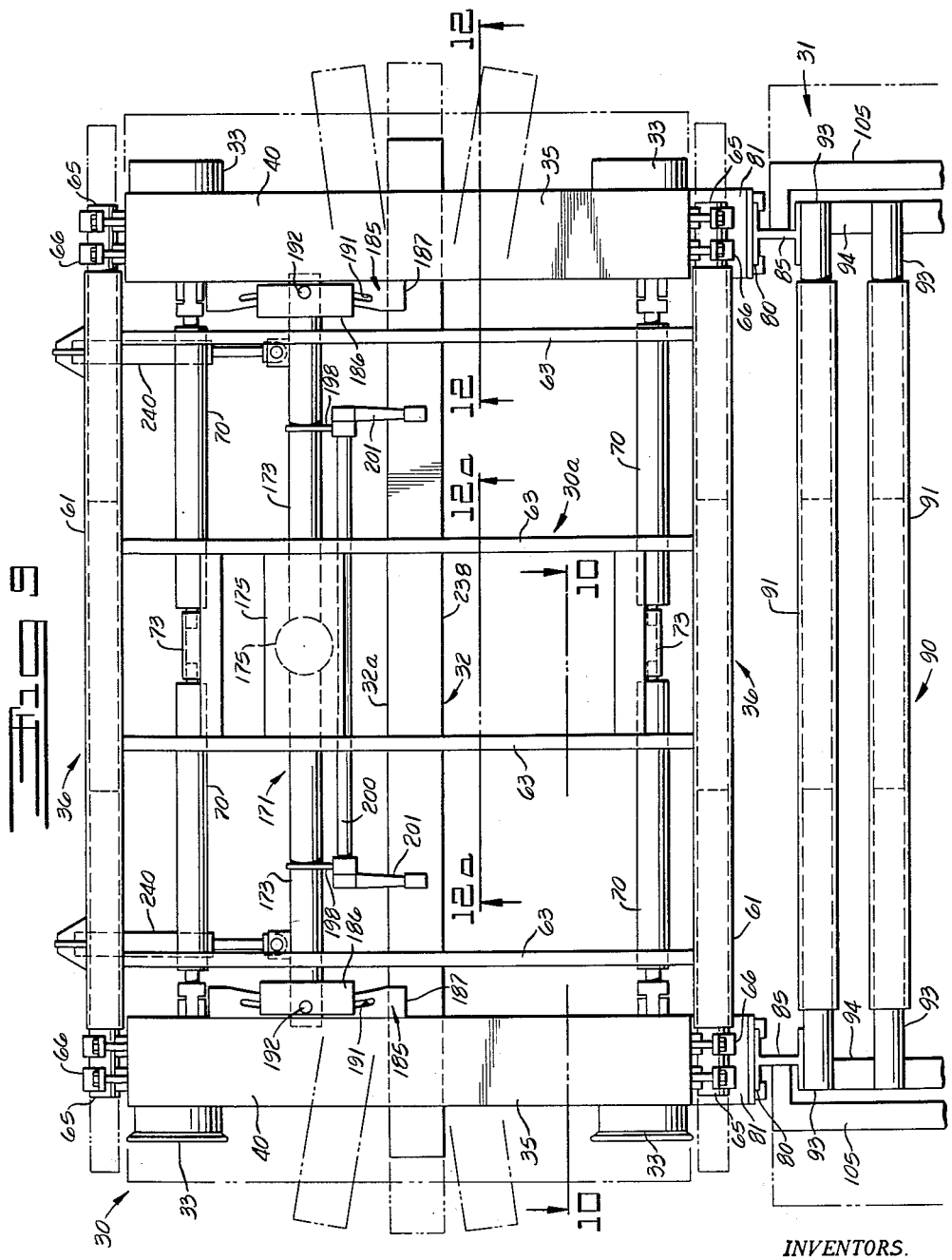

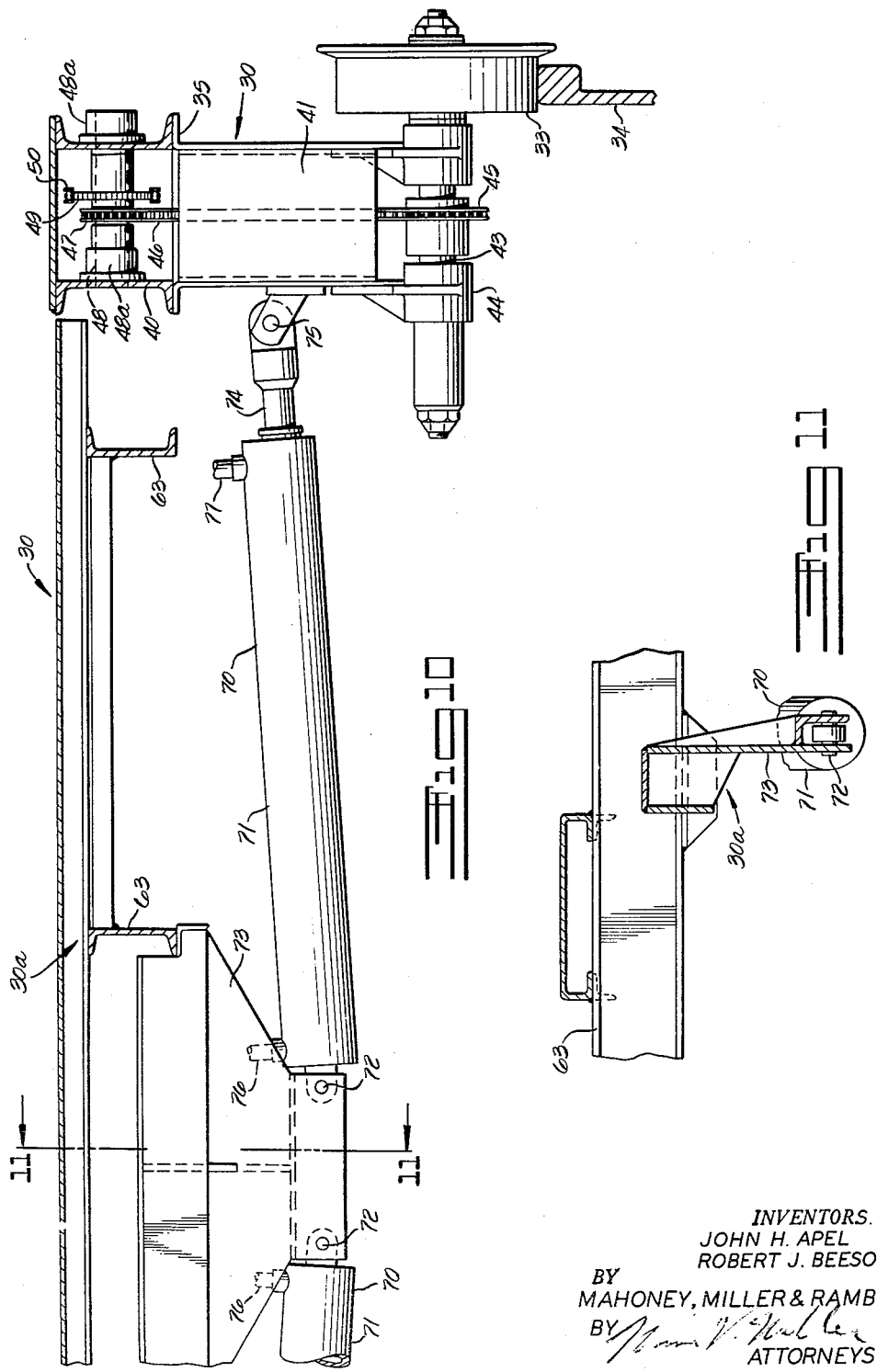

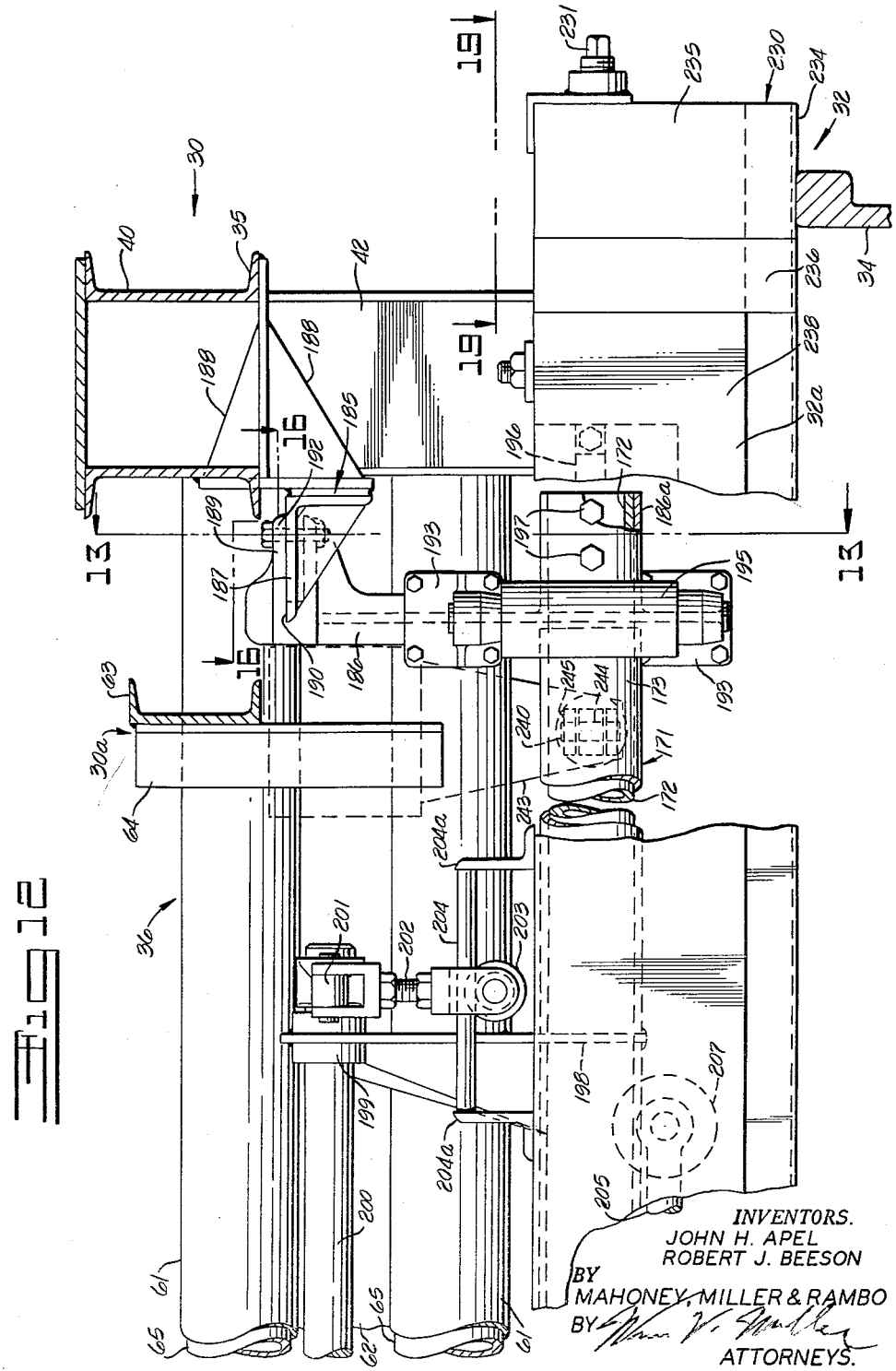

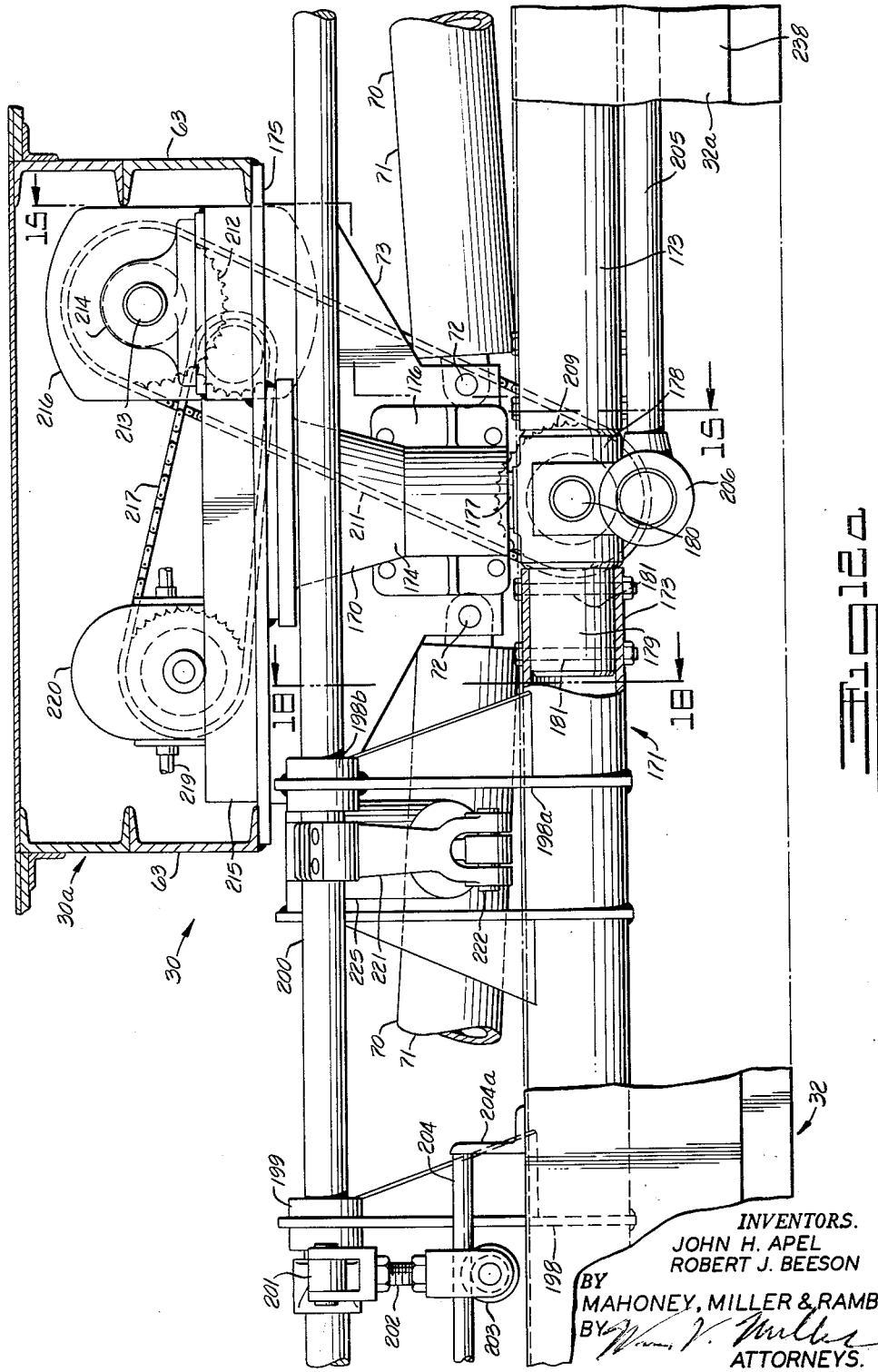

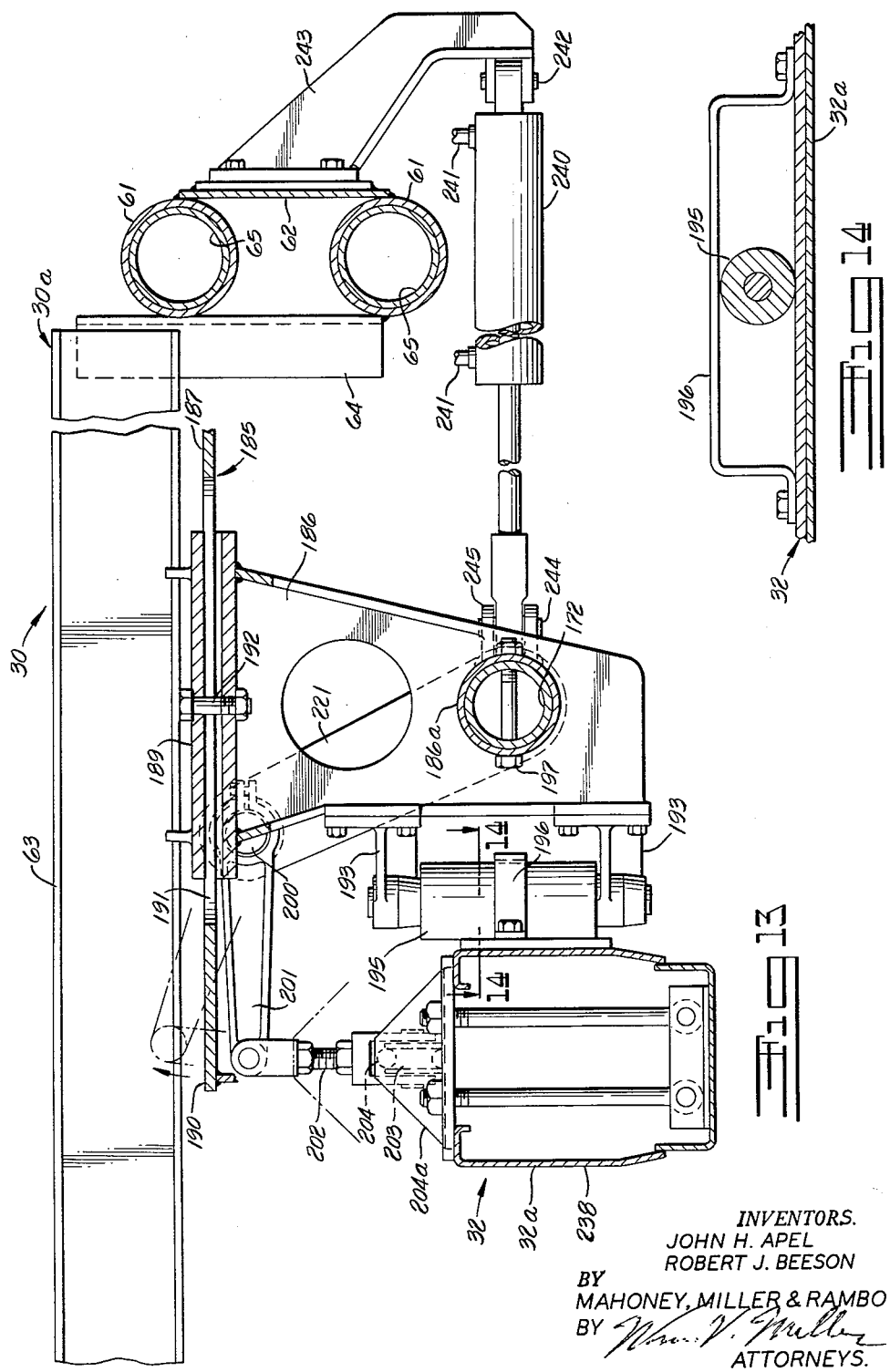

Jan. 2, 1962   J. H. APEL ETAL   3,015,258
PAVING MATERIAL SPREADER
Filed Nov. 27, 1959   14 Sheets-Sheet 11
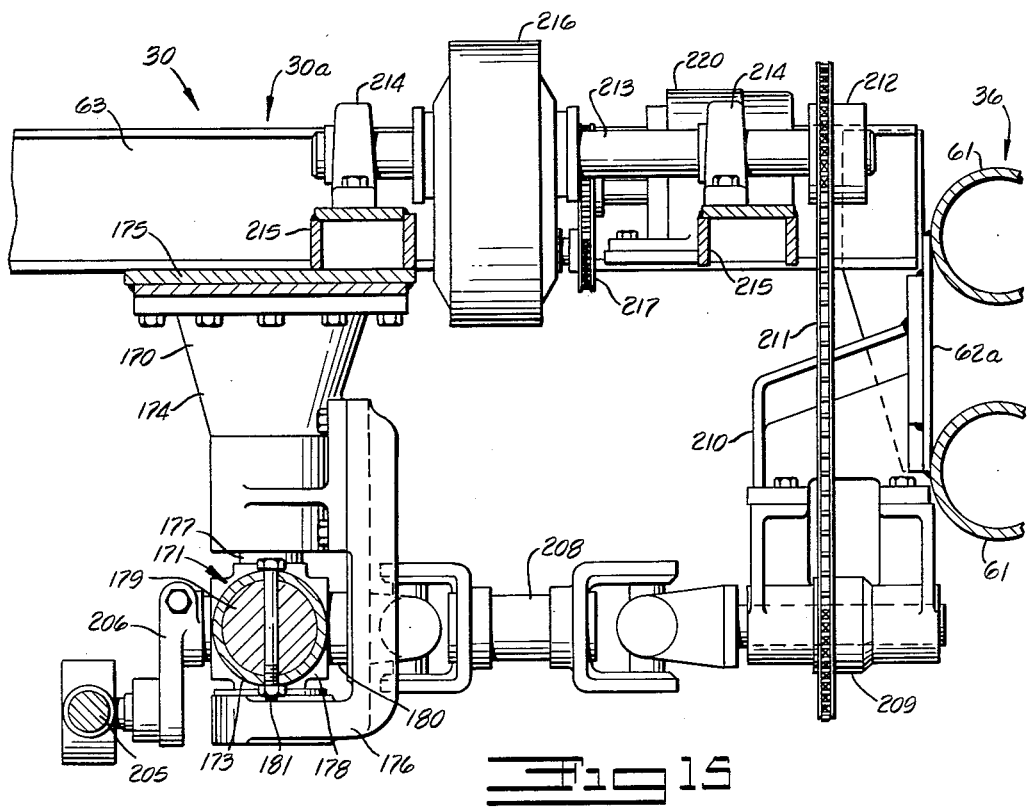
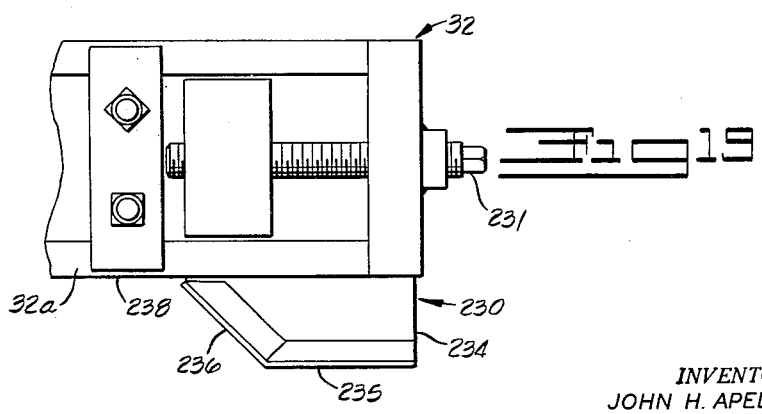
INVENTORS.
JOHN H. APEL
ROBERT J. BEESON
BY MAHONEY, MILLER & RAMBO
BY
ATTORNEYS.

Jan. 2, 1962 J. H. APEL ETAL 3,015,258
PAVING MATERIAL SPREADER
Filed Nov. 27, 1959 14 Sheets-Sheet 12

INVENTORS.
JOHN H. APEL
ROBERT J. BEESON
BY MAHONEY, MILLER & RAMBO
BY
ATTORNEYS.

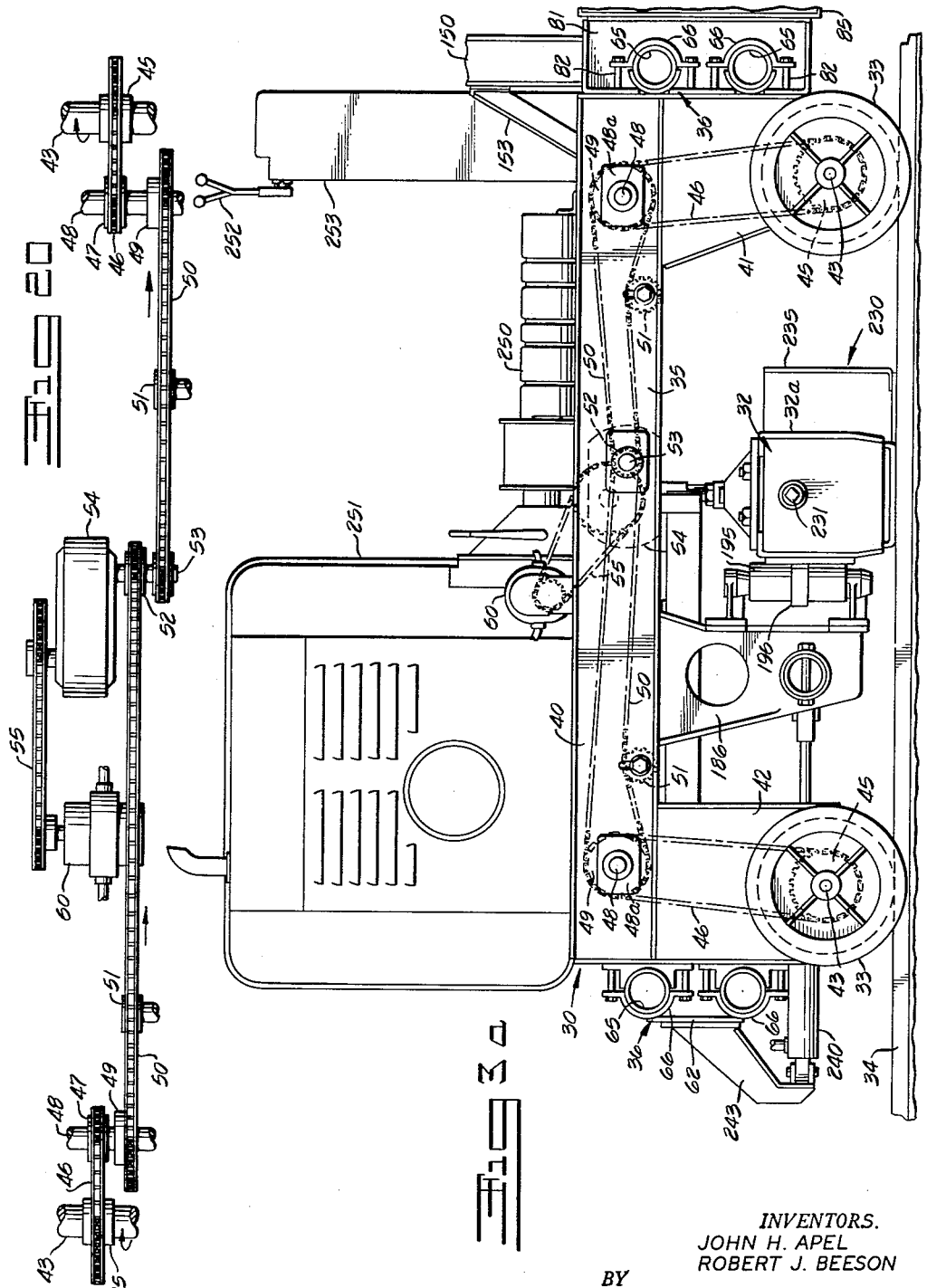

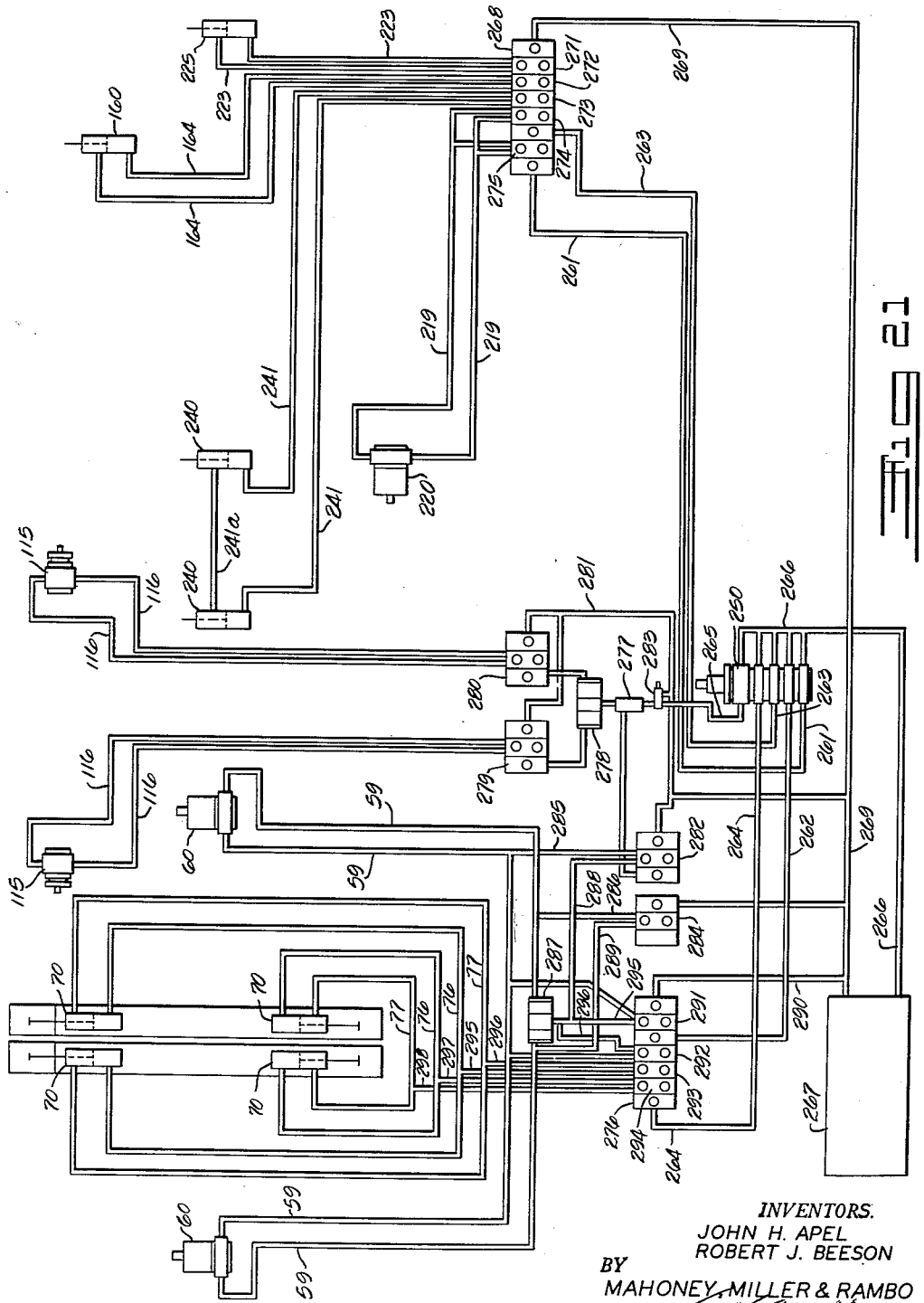

United States Patent Office 3,015,258
Patented Jan. 2, 1962

3,015,258
PAVING MATERIAL SPREADER
John H. Apel, Columbus, and Robert J. Beeson, Hilliards, Ohio, assignors to The Jaeger Machine Company, Columbus, Ohio, a corporation of Ohio
Filed Nov. 27, 1959, Ser. No. 855,628
14 Claims. (Cl. 94—46)

Our invention relates to a paving material spreader. It has to do, more particularly, with a spreading machine which is adapted to operate on side forms to spread material deposited between the side forms and strike it off at a desired level and to thereby form a slab, monolith, or layer of paving material extending from one form to the other and being of a predetermined thickness and crown. The machine is especially suitable for spreading concrete and the following description will refer to concrete but it is to be understood that the machine is not limited in its use to that specific material.

According to our invention, we provide a concrete spreader which preferably uses hydraulic power for all its functions and adjustments. This concrete spreader machine includes a supporting truck or frame adapted to move along laterally spaced side forms for spreading concrete between the two forms evenly and quickly and at a desired level, either at the level of or below the level of the upper edges of the forms. The truck frame is adjustable as to width, and may be adjusted hydraulically, so that as the machine moves along the side forms, it may be adjusted in accordance with the variations in spacing of the side forms due to their divergence or convergence at bridge approaches, curves, etc. The hydraulic controls for the adjusting means are such that small or large adjustments can be made as necessary without interrupting movement or operation of the machine. Thus, a concrete slab which varies in width may be produced readily.

The concrete spreader, according to our invention, includes a conveyer extending across the front of the machine which is composed of two oppositely extending separate material-spreading screws which are mounted end-to-end. Each screw can be operated independently of the other and can be rotated in either direction. The screws are provided with a telescopic drive so that they can be extended or retracted while rotating in accordance with the lateral extension or retraction of the truck frame which, in turn, is in accordance with the variation in spacing of the side forms. The screws are so supported that they can be adjusted to different vertical positions relative to the forms, even below the top edges of the forms. Furthermore, the screws are so driven that the drive need not be interrupted during this adjustment. Close behind the screw conveyer and supported by the same means for adjustment therewith, a strike-off is provided and this strike-off is also adjustable relative to the screw so that its strike-off edge will be above or below the bottom of the screw as desired. The strike-off can be adjusted flat or with any desired crown and its main supporting structure is of telescopic construction so that as the screw conveyer is extended or retracted, the strike-off will be adjusted similarly.

The spreader can be equipped with a screed located behind the strike-off member which may be supported and oscillated or reciprocated at 90° to the forms. However, as preferred and as shown in this application, the screed may be connected to a screed support which is supported at its center or midway of its length so that the support and, consequently, the screed can be turned in either direction from the 90° position and the screed can still be oscillated or reciprocated. The screed is so connected to its support and the support is so carried on the machine that there will be no interference with the lateral adjustment of the truck frame of the machine but in fact the screed and its support is so related and connected to the frame that the screed is supported at varying positions along its length in accordance with the lateral adjustment of the frame.

In the accompanying drawings we have illustrated a preferred embodiment of our invention but it is to be understood that specific details thereof may be varied without departing from basic principles.

In these drawings:

FIGURE 1 is a perspective view, partly broken away, of a concrete spreader embodying our invention.

FIGURE 2 is an enlarged partial front elevational view at one side of the machine of FIGURE 1 showing one screw and the associated strike-off blade together with supporting and adjusting structure therefor.

FIGURE 3 is a side elevational view of a portion of the machine taken along line 3—3 of FIGURE 2 showing the screw conveyer assembly and the drive therefor.

FIGURE 3a is a side elevational view of the truck of the machine.

FIGURE 4 is a vertical sectional view taken along line 4—4 of FIGURE 2 showing the screw conveyer support on the front end of the truck.

FIGURE 5 is an enlarged detail in horizontal section taken along line 5—5 of FIGURE 3 showing the conveyer-supporting slide arrangement.

FIGURE 6 is an enlarged horizontal sectional view taken along line 6—6 of FIGURE 1 through one of the screws showing details thereof.

FIGURE 6a is an enlarged detail of a packing and scraper arrangement on the screw.

FIGURE 7 is an enlarged detail view taken transversely along line 7—7 of FIGURE 6.

FIGURE 8 is a similar view taken along line 8—8 of FIGURE 6.

FIGURE 9 is a schematic top plan view of the spreader with parts eliminated for clarity and indicating by broken lines adjustments of the machine.

FIGURE 10 is an enlarged vertical sectional view taken along line 10—10 of FIGURE 9, showing the ram units used for extending the side trucks of the machine.

FIGURE 11 is a vertical sectional view taken along line 11—11 of FIGURE 10, showing the means for supporting the rams.

FIGURE 12 is a vertical sectional view taken along line 12—12 of FIGURE 9 showing details of the truck and screed supported thereon and adjusting means therefor.

FIGURE 12a is a vertical sectional view taken along line 12a—12a of FIGURE 9 showing the center pivot means for the screed and other mechanism associated with the screed.

FIGURE 13 is a vertical sectional view taken along line 13—13 of FIGURE 12 showing supporting and adjusting mechanism for the screed.

FIGURE 14 is a detail in horizontal section taken along line 14—14 of FIGURE 13 showing a thrust roller for the screed.

FIGURE 15 is a vertical sectional view taken along line 15—15 of FIGURE 12a showing additional details of the screed pivot and the screed oscillating drive.

FIGURE 19 is a horizontal plan view taken along line 19—19 of FIGURE 12.

FIGURE 20 is a schematic view of the drive mechanism of one of the side trucks of the machine.

FIGURE 21 is a diagrammatic view of the hydraulic system of the machine.

Figure 16:
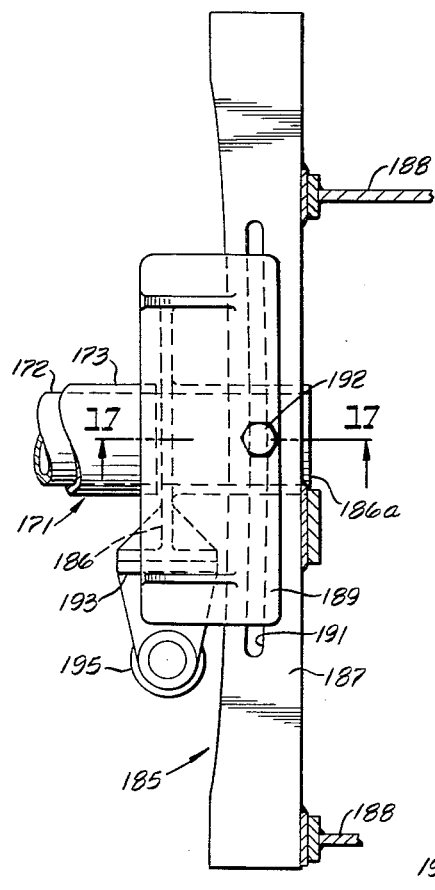
FIGURE 16 is a detail in horizontal section taken along line 16—16 of FIGURE 12 showing additional details of the screed support.
Figure 17:
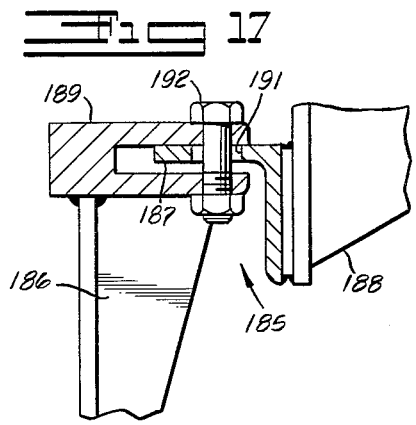
FIGURE 17 is a vertical sectional view taken along line 17—17 of FIGURE 16.

With reference to the drawings, our machine is illustrated as comprising mainly a frame unit or truck 30, a conveyer and strike-off unit 31 extending transversely across the front of the unit 30 and carried by such unit, and a screed unit 32 which extends transversely beneath the unit 30 and is carried thereby at a location behind the unit 31.

The truck unit 30 is carried by the flanged truck or traction wheels 33 which operate along the side forms 34 which are spaced a predetermined distance laterally and will form the side edges of the concrete slab to be produced by our machine. The spacing of the forms 34 may vary, as previously indicated, and the truck frame is so constructed that it can be extended or retracted laterally in accordance with any such variation even while the truck 30 is moving along the forms. This unit 30 is illustrated in FIGURES 1, 3, 3a, 4, 9, 10, 12, 12a and 13.

The truck 30 comprises the side trucks 35 extending longitudinally of the machine and each of which is supported by a pair of the wheels 33 in tandem. The side trucks 35 are joined together in laterally spaced relationship by means of front and rear frame trusses 36 connected at their outer ends to the front and rear ends, respectively, of the side trucks 35. The trusses 36 are of tubular telescoping construction so that the frame of the truck unit 30 can be widened or narrowed.

The side trucks 35 include the longitudinally extending beam members 40 of box cross section (FIGURES 10 and 12) which are provided with the front depending bearing supports 41 and the rear depending bearing supports 42 (FIGURES 1, 3a and 10) which carry the bearing 44 for the axles 43 to which are keyed the wheels 33. The supports 41 and 42 are arranged in pairs of laterally spaced vertically disposed parallel supports and the bearings 44 thereof receive the stub-axles 43. The arrangement of the supports 41 is illustrated in FIGURE 10 and the supports 42 are similarly arranged. Each axle 43 is driven by means of a sprocket 45 keyed thereon (FIGURES 3a and 10) which, in turn, is driven by a chain 46 that passes upwardly around a driven sprocket 47 that is carried by a transverse stub shaft 48 rotatably mounted within the beam 40 by bearings 48a. The two shafts 48 at the front and rear of each beam 40 are driven in the same direction by the drive arrangement shown best in FIGURES 3a and 20. Thus, each shaft 48 carries a driving sprocket 49 that is driven by a chain 50 extending horizontally within the beam 40, a take-up idler 51 engaging each chain and being mounted for vertical take-up adjustment on the beam 40. The chains 50 pass around drive sprockets 52 supported by a common drive shaft 53 which extends outwardly from a speed-reducing gear unit 54. The unit 54 and associated shaft 53 and sprockets 52 are supported within the beam 40, the unit being intermediate the ends of the beam. This unit 54 is driven by means of a chain and sprocket drive 55 from a reversible hydraulic motor 60 which is supported on top of the beam 40 (FIGURES 1 and 3a). Connected to the motor 60 are the flexible hydraulic lines 58 and 59. Thus, each side truck driving mechanism is self-contained in the truck which is important to permit lateral adjustment of the main or truck unit frame.

The frame trusses 36 at the forward and rearward sides of the unit 30 are shown best in FIGURES 3, 3a, 4, 9, 12, and 13. Each truss comprises a pair of centrally disposed vertically spaced transversely extending tubes or pipes 61 which are rigidly joined together by a plate 62 welded to the outer sides thereof. The forward and rearward trusses 36 are rigidly joined together by a plurality of laterally spaced, longitudinally extending, parallel beams 63. The ends of these beams 63 may be rigidly joined to the trusses by the upstanding angle brackets 64 (FIGURES 12 and 13) which may be welded to the inner surfaces of the tubes 61 and to the beams 63. Thus, the trusses 36 and the beams 63 are rigidly connected into what may be termed a central frame section designated generally by the numeral 30a.

On the central frame section 30a, the side trucks or side frame sections 35 are mounted for lateral adjustment independently relative to the central frame section. This is accomplished by having the pipe or tube sections 65 rigidly carried by the trucks 35 extending inwardly therefrom and telescoping within the associated outer ends of the slightly larger diameter tubes 61, it being understood that the tubes 65 are vertically spaced and located along the trucks 35 for proper cooperation with the tubes 61. The outer ends of the smaller tubes 65 are rigidly connected to the trucks 35 in the manner shown in FIGURES 3, 3a, 5, and 9. These connections include the clamps 66 at the forward and rearward ends of the trucks 35 which embrace the tubes 65 and clamp them against the ends of the trucks 35 at the ends of the beam 40 and the respective depending wheel supports 41 and 42.

Thus, with the above-described frame arrangement there is a central main frame section 30a and a laterally adjustable frame section or truck carried at each side thereof and independently adjustable thereon by the telescoping connections.

The independent adjustment of each of the side trucks 35 relative to the central frame section 30a, is accomplished by means of the pairs of double-acting hydraulic rams 70 (FIGURE 9) carried at the forward and rearward sides of the center frame section 30a. The rams 70 are arranged in opposed pairs and each ram is connected at its inner end to the frame 30a and at its outer end to the truck 35. Thus, as shown in FIGURES 10 and 11, each ram 70 has a cylinder 71 which is pivoted at its inner end at 72 to a centrally disposed support 73 which depends from the central frame section 30a, being rigidly carried by the two center beams 63 thereof. The cylinder has a rod 74 projecting outwardly therefrom and the outer end of the rod is pivoted at 75 to the inner support 41 or 42 of the truck 35. Hydraulic fluid is supplied to and exhausted from each cylinder 70 by means of the flexible lines 76 and 77 and the two cylinders 71, at each side, are controlled in synchronism, as will later appear, to adjust the connected truck 35 relative to the frame 30a.

As previously indicated, the spreader conveyer unit 31 extends across the front of the machine. It includes a telescopic arrangement so that when the truck frame of the unit 30 is expanded or retracted laterally, the unit 31 expands or retracts accordingly. The unit 31 and its connection to the unit 30 is illustrated best in FIGURES 1 to 9, inclusive.

For connecting the unit 31 to the unit 30, each of the side trucks 35 is provided with a vertically disposed guideway 80 at its forward end, as shown best in FIGURES 3 to 5 and 9. The guideway 80 is formed on the forward side or face of an upstanding column or I-beam 81. This beam 81 is fastened or welded to the face of the support 41 at the front of the truck. It will be noted that the end of the tube 65 passes through the web of the column. It will also be noted best from FIGURE 5 that the clamps 66 which attach the outer end of the tube 65 to the truck are within the column 81 and that the bolts 82 thereof pass rearwardly through the front flange of the support 41. Thus, a vertically disposed guideway 80 is provided at each side of the machine on the front end of each respective truck 35 and these guideways are always laterally parallel although they adjust laterally with the trucks 35.

For cooperating with the guideways 80, the unit 31 carries at its rear sides in laterally spaced relationship the upstanding slide members 85 which are in the form of I-beams and the rear flange of each of which is disposed in the associated guideway 80. Thus, the unit 31 can slide vertically relative to the unit 30.

The unit 31 includes a supporting truss 90 which is similar to the trusses 36, previously described in connection with the truck unit 30, in that they are of tubular telescoping construction and extend transversely across the unit. However, the telescoping tubes thereof are spaced forwardly and rearwardly of each other and are in a horizontal plane as shown best in FIGURES 1, 4 and 9. This truss 90 comprises a pair of centrally disposed horizontally spaced tubes or pipes 91 which are rigidly joined together by forwardly and rearwardly extending braces 89 which are welded or otherwise secured thereto at spaced intervals therealong. Telescoping within the outer ends of the tube sections 91 are the smaller diameter tube sections 93. These sections 93 are rigidly connected at their outer ends to the vertically disposed screw conveyer supporting and driving assemblies 94. Telescopic adjustment of the truss 90 will, therefore, result in corresponding variation in the spacing of the assemblies 94 which are adapted to be disposed adjacent the side forms 34.

The outer ends of the tube sections 93 are connected to the assemblies 94 in the manner shown best in FIGURES 1 and 2. Each assembly 94 is provided on its upper end with a supporting shelf and bracket member 95 of inverted U-form into which the ends of the tubes 93 extend and to which they are rigidly secured. This bracket 95 is mounted at the inner side of an upstanding plate 96 which extends forwardly and rearwardly. This plate is a screw mounting plate for mounting the associated ends of the screw conveyer 100, which includes the oppositely feeding screw members 97. This plate also serves to prevent the feeding of material by the screw members 97 outwardly beyond the side forms 34. Thus, each plate 96 carries a bearing 98 for the outer end of the associated screw member 97. The inner end of each screw member is carried by one part of a double bearing 99 which is supported at the lower end of a depending support 101 which is fixed at its upper end to the central tubes 91 of the truss 90 laterally midway of the ends thereof. Thus, each screw member 97 may be driven independently of the other.

To further aid in the preventing of feed of material by the screws 97 over the side forms 34, a longitudinally extending shoe 105 (FIGURES 1 to 3) is carried by each plate 96 for vertical floating movement. The shoe 105 is provided with a horizontal flange 106 which slides along the top edge of the form and an upstanding inner flange 107 which will overlap the lower edge of the associated plate 96 even if it is positioned slightly above the upper edge of the associated form 34. The shoe 105 is mounted outside the plate 96 in spaced relationship thereto by means of a pair of rods 107a upstanding from the flange 106 and vertically slidable within the sleeve brackets 108 carried by the plate 96. Thus, the shoe 105 may engage the form 34 even if the plate 96 is adjusted vertically relative to the form within limits.

Each screw member 97 is driven at its outer end by drive mechanism which is part of the associated assembly 94. On the outer end of each screw 97 (FIGURE 3) a driven sprocket 110 is keyed. This sprocket is driven by means of a chain 111 from an upper sprocket 112. The chain and sprockets are disposed within a housing or guard 113 at the outer side of the assembly 94. The sprocket 112 is driven by a gear-reducing box 114 which, in turn, is driven by a reversible hydraulic motor 115. The box 114 and motor 115 are supported by the shelf bracket 95 of the assembly 94. Flexible fluid lines 116 run to and from the motor 115. Thus, lateral adjustment of the assembly 94 will not interfere with the drive to the screw member 97 connected thereto.

It will be understood, however, that to permit the lateral adjustment of the assemblies 94, each screw 97 connected thereto must also be of a telescoping structure. Therefore, we construct each screw member in the manner shown in FIGURES 6 to 8. Each screw includes the drive shaft 120 of circular cross section, to the outer end of which the driven sprocket 110 is keyed (FIGURE 6). This shaft telescopes within the outer end of the hollow shaft member 121 which is of square form. Fastened to the inner end of the circular shaft 120 (FIGURE 7) by a transverse pin 122 and by a key 123 is a square bearing and driving member 124 which fits snugly but slidably within the hollow shaft 121. Thus, the pin 122 will serve to connect the member 124 for axial movement therewith at which time it will slide in the shaft 121. The key 123 provides a driving connection between the shaft 120 and the shaft 121 whereby when the shaft 120 drives, the member 124 will drive the hollow shaft 121. Within the outer end of the square shaft 121, a bearing member 125 of square outer form is bolted by means of the bolts 126. This bearing 125 has a circular bushing 127 at its interior which receives the shaft 120 for relative axial sliding movement. As shown best in FIGURE 6a, a packing gland 127a is provided at the outer end of the bearing 127 and an associated collar 127b. The collar 127b has a sharp scraping inner edge which scrapes most of the concrete off the circular shaft 120 as it moves into the hollow shaft 121 and the gland 127a will wipe off the rest. Thus, each screw section 97 can telescope or extend to different overall lengths without interfering with the driving thereof. Each square shift 121 has the helical material engaging blades 128 wound therearound and preferably secured thereto by welding.

Slight adjustment of the assemblies 94 outwardly from the outer ends of the shafts 121 will not require the addition of helical blade sections. However, if substantial adjustments are made, it may be desirable to add helical sections 128a as shown in FIGURES 1, 2 and 4. This is accomplished by clamping around the circular shaft 120 the semi-circular sleeve sections 129 of suitable length by means of the clamp bolts 129a. One of these sleeve sections 129 will carry the blades 128a which will be continuations of the blades 128. Thus, auxiliary screw blade sections can be added to provide extensions of various lengths.

As part of the unit 31, behind the conveyer screw 100, we provide a strike-off plate and supporting arrangement 130 which extends transversely between the assemblies 94. This strike-off plate arrangement is an extensible and retractable supporting plate structure and, therefore, although its outer ends are carried by the assemblies 94, these assemblies can be laterally adjusted without interference with or by the strike-off plate structure.

The strike-off plate arrangement 130 is shown best in FIGURES 1, 2 and 4 and comprises a central support plate 131 which is vertically disposed and extends transversely of the unit 31 in parallel relationship to the screw conveyer 100, being spaced slightly behind the screw conveyer. The upper edge of this plate 131 is welded or otherwise secured to the braces 92, that are attached to the supports 89 of the central tube sections 91, and also to the depending support 101. The plate 131 is backed-up by the upright braces 92a. The plate 131 has a strengthening channel 132 along its lower edge. At its lower edge the plate 131 carries along its entire length strike-off plate sections 133 which are vertically adjustable thereon by means of the pin and slot connections 134 to provide the desired crown and locate the strike-off edge at the correct height.

End strike-off support plates 135 are provided at both ends of the main plate 131, the outer end of each plate 135 being attached to the assembly 94 for movement therewith and the inner end extending into overlapping relationship with the plate 131. The outer end of each plate 135 is welded or otherwise secured to a vertical bracket 136 which is welded or otherwise secured to the inner surface of the plate 96. The upper edge of each plate 135 is provided with a forwardly projecting guide flange 137 which fits into a guideway 138 at the front of the plate 131 and which is disposed adjacent the upper edge and outer end of the plate 131. The guideway 138 is provided in a bracket 139 which extends longitudinally of the plate 131 and which is attached to that plate and to the braces 92. The lower edge of each plate 135 carries a series of vertically adjustable edge plate sections 133a which overlap the inner surface thereof and which are attached thereto by bolt and slot connections 146. Thus, the strike-off support plates 131 and 135 overlap and extend and retract relatively and the edge plate sections 133 and 133a may be added or removed as necessary.

As previously indicated, the entire unit 31 is vertically adjustable at the front of the truck unit 30 and during this adjustment the slide members 85 carried by the rear side of the unit 31 will slide in the guideways 80 carried at the front of the unit 30. Furthermore, because of this sliding connection between these two units, the lateral extension or retraction of the unit 30 will produce a similar action in the unit 31, the latter unit being provided with the extensible and retractable conveyer and strike-off structures to permit this. Furthermore, extension and retraction of the unit 31 will not interfere with the drive to the conveyer 100.

For adjusting the unit 31 vertically, we provide the structure illustrated best in FIGURES 1, 2 and 4. This structure includes the pair of upstanding columns or supports 150 which are carried by the unit 30, being rigidly attached at their lower ends to the ends of the central tubes 61 of the front truss 36, the attaching means including brackets 151 welded to both the upper and lower tubes 61 and to which the column 150 is connected by means of bolts 152. These upstanding columns 150 are braced by a diagonal brace 153 shown in FIGURES 1 and 3a. A similar central support column 154 is provided intermediate the length of the truss 36 and is connected the same way (FIGURES 2 and 4).

Each of the columns 150 and 154 carries on its upper end a bearing 155. These bearings rotatably receive a transversely extending rock shaft 156. On the outer ends of the shaft 156 supporting rocker arms 157 are keyed and extend forwardly therefrom. From these rocker arms the unit 31 is suspended by means of turnbuckle links 158 which are pivoted at their upper ends by clevis connections 159 to the arms 157 and at their lower ends by clevis connections 161 to the tube 91 of the truss 90 provided at the upper side of the unit 31, the connections being adjacent the ends of the tube 91.

For rocking the shaft 156 to raise or lower the unit 31 relative to the front of the truck unit 30, we provide a hydraulic arrangement. This arrangement includes a double-acting ram 160, the cylinder of which is pivoted at its lower end at 162 to a bracket 163 attached to the plate 62 of the truss 36 intermediate the length of that plate. Flexible fluid lines 164 are connected to the ram 160. The piston rod 165 of the ram extends upwardly therefrom and its upper end is connected by a clevis pivot connection 166 to the outer end of an actuating rocker arm 167 which is keyed to the shaft 156 intermediate its ends, adjacent the support column 154, and extends forwardly therefrom. It will be apparent that if the ram 160 is actuated to rock the shaft 156, the supporting arms 157 will be rocked and will, therefore, raise or lower the unit 31. This raises or lowers the conveyer 100 and its associated strike-off blade 130 so that these members may be adjusted relative to the side forms and may even be positioned downwardly within the side forms. During this adjustment, the shoes 105 will remain in engagement with the side forms. The lower edge of the strike-off blade structure may be adjusted relative to the screw conveyer by proper positioning of the edge plates 133 and 133a relative to the respective main plates 135 and 131.

As indicated previously, a screed unit 32 may be provided on the truck unit 30 at a suitable location behind the spreading conveyer and strike-off unit 31. We have illustrated this screed unit as being of the pivoted or diagonal type but our invention is not limited to that type. The screed pivot 170 is located substantially midway of the front and rear ends of the truck unit 30, as shown best in FIGURE 9.

The diagonal screed unit 32 is shown best in FIGURES 3a, 9, 12a, and 12 to 18, inclusive. The screed 32a itself of the unit is of rigid construction and is associated with the unit 30 of the machine, so that it can be reciprocated, can be angularly adjusted, and can be elevated, all of these movements being hydraulically controlled. In actual use, as shown in FIGURE 12, this screed rests on the side forms 34. The screed itself may be of the detailed box beam structure disclosed in the patent to Millikin No. 2,299,700.

The screed is carried by or connected to a telescopic tube structure 171 which is carried by the pivot structure 170 and the outer ends of which are connected to the trucks 35 for lateral extension and contraction therewith. This telescopic tube structure 171 comprises a pair of outer tubes 173 carried by the pivot structure 170 and a pair of inner tubes 172 which have their inner ends telescoping within the outer ends of the tubes 173. The pivot structure 170 includes a housing 174 which is bolted to a transverse support plate 175 and depends therefrom, the plate being attached to the two central beams 63 of the central fixed frame section 30a. Rotatably mounted within the housing 174 and a bearing bracket 176 that is attached to the housing 174 is a vertically disposed pivot pin 177. This pin 177 (FIGURES 12a and 15) carries a bearing sleeve member 178 and projecting laterally from opposite sides of this member 178 are cylindrical extensions 179 over which the inner end of each tube 173 slips and to which it is bolted by bolts 181. The bearing member 178 has a shaft 180 extending rearwardly and forwardly therethrough and which is rotatable therein for a purpose which will be later described.

The tubes 172 are provided with bearing and guide structures 185 at their outer ends which permit arcuate swinging of such outer ends and also the extension and retraction of the telescopic screed supporting tube structure 171 in accordance with lateral movement of the truck 35. This bearing structure also includes means for taking the thrust exerted on the screed member 32a at its ends.

These bearing and guide structures 185 are illustrated best in FIGURES 9, 12 to 14, 16 and 17. Each structure comprises a vertically disposed supporting arm 186 which is suspended from a guide track 187. The track 187 is rigidly attached by outwardly extending brackets 188 to the beam 40 of the associated side truck 35 (FIGURE 12). The upper end of the arm 186 has a guide member which straddles the horizontal inwardly extending flange 190 of the guide track angle 187. The flange 190 has an arcuate guide slot 191 formed therein and a guide pin 192 carried by the member 189 operates in this slot. Thus, the member 186 will move in and out with the associated truck 35 but the member 186 will always be free to travel along the guide track 187.

Each arm 186 carries at its forward edge a pair of roller-supporting brackets 193 which support a vertical thrust-roller 195. The roller 195 engages the rear side of the screed 32a (FIGURES 3a, 13 and 14) and is disposed within an elongated U-shaped strap 196 which is fastened to the rear side of the screed. This will provide an elongated guide for the roller 195 and will permit necessary reciprocation of the screed 32a as well as lateral movement of the roller 195 relative to the screed as it moves in and out with the support arm 186 as it, in turn, moves in and out with the associated side truck 35. The arm 186 is connected to the outer projecting end of the associated inner tube 172 of the tube structure 171 by means of the bolts 197 which pass through a sleeve 186a formed on the arm 186, which slips over the outer end of the tube 172.

The screed 32a is connected to the tube structure 171 in such a manner as to permit reciprocation of the screed. For this purpose, a support 198 is rigidly secured to each tube 173 (FIGURES 9, 12, and 12a) between the bearing and guide structure 185 and the pivot 170 at each side of the pivot. These supports 198 carry bearings 199 in which a transversely extending rock shaft 200 is rotatably mounted. The shaft is also supported in a triangular plate 198a and bearing 198b which is carried by one of the tubes 173 adjacent the pivot 170. Adjacent its ends, this rock shaft 200 has the rocker-supporting arms 201 (FIGURES 9, 12 and 12a) keyed thereon and extending forwardly therefrom. Suspended from the outer ends of the arms 201 by adjustable rods or turnbuckles 202 are the grooved rollers 203. The rollers 203 are associated with the transverse rods 204 which are secured to the upper edge of the screed 32a by the brackets 204a. This provides a lifting connection between the arms 201 and the screed 32a but when the screed is lowered onto the forms 34, the screed 32a can reciprocate since the rods 204 will merely move back and forth relative to the rollers 203.

For reciprocating the screed 32a, we provide a pitman structure 205 which will not interfere with vertical or angular movement of the screed. This pitman is driven by a crank 206 keyed on the forward end of the shaft 180 (FIGURE 15) carried at the screed pivot 170. The outer end of the pitman is pivotally connected to the screed as indicated at 207 in FIGURE 12. The shaft 180 is driven by a flexible shaft coupling joint 208 so that the drive will not interfere with pivoting movement of the screed 32a about the pivot 170. This joint 208 is driven by a shaft and sprocket unit 209 which is carried on the lower end of a depending support 210 that is attached to the forward side of a plate 62a that is welded to the tubes 61 of the rear truss 36. The sprocket 209 is driven by a chain 211 (FIGURES 12a and 15) from an upper sprocket 212 which is carried on the outer end of a horizontal shaft 213 that is rotatably mounted on bearings 214 which are carried by supports 215 extending between the two central beams 63 of the fixed central part 30a of the truck unit frame. The shaft 213 is driven by a gear reduction unit 216, supported in association therewith, and this unit is driven by means of a chain and sprocket drive 217 from a hydraulic motor 220 supported by the frame 30a in association therewith. Fluid lines 219 are connected to this motor.

Figure 18:
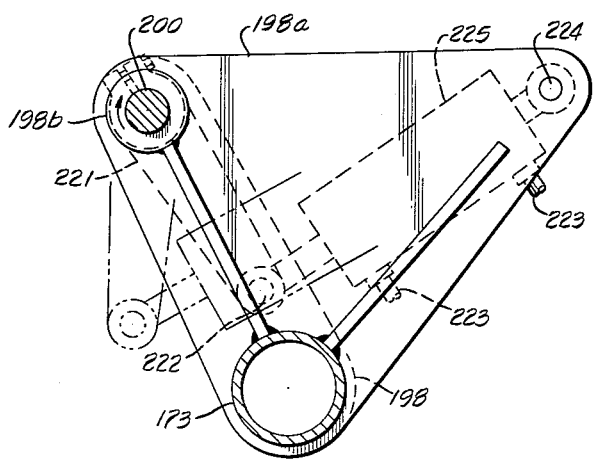
FIGURE 18 is a vertical sectional view taken along line 18—18 of FIGURE 12a, showing the ram mechanism for raising and lowering the screed.

To raise and lower the screed 32a, the shaft 200 is rocked and this will swing the arms 201 vertically to raise or lower the level of the screed-suspending rollers 203 and the cooperating rods 204. For rocking the shaft 200, the rocker arm 221 is provided, as shown in FIGURES 12a and 18. The upper end of this arm 221 is keyed and clamped to the shaft 200 and its lower end is pivoted at 222 to the piston rod of a double-acting hydraulic ram 225. Flexible hydraulic lines 223 are connected to this ram 225. The rear and upper end of the cylinder of the ram is pivoted at 224 to the rear upper point of the associated triangular support 198 which supports the ram. Thus, it will be apparent that actuation of the ram 225 will raise or lower the screed 32a. For transportation, the screed will be raised to a much higher level than the upper edges of the forms 34. However, during use of the machine, the screed will be lowered so that its ends will rest on the upper edges of the forms, as indicated in FIGURE 12.

The ends of the screed 32a are provided with the end shoes and baffles 230 as shown best in FIGURES 12 and 19. Each shoe is preferably adjustable along the screed by mechanism like that disclosed in the copending application of Millikin Serial No. 669,824, filed July 3, 1957, and which is operated by means of a screw 231. The shoe is provided with a forward extension 234 that is provided with a material-engaging upstanding plate 235 which has an inwardly angled portion 236. Thus, the forwardly projecting wing structure, provided by the angled surface 236, will limit outward movement of the material along the face 238 of the main screed so that it will not spill over the side forms 34. Since the shoes 230 are preferably longitudinally adjustable along the screed, they can be adjusted along the screed in accordance with the spacing of the side forms 34.

For swinging the screed 32a and its support 171 about the pivot 170, as desired, we provide the arrangement shown in FIGURES 3a, 9, 12 and 14. This arrangement includes a pair of double-acting hydraulic rams 240 which are carried at the rear of the truck unit 30, one ram being disposed at each side thereof. Each ram 240 has flexible hydraulic lines 241 connected thereto. The rear end of the cylinder of each ram is pivoted for horizontal swinging by a pivot 242 carried on the lower end of a bracket 243. This bracket 243 is bolted to the plate 62a that is attached to the fixed tubes 61 of the rear truss 36. The piston rod of the ram is connected for horizontal swinging by a pivot pin 244 which is carried by lugs 245 on the outer end of the tube 173 of the screed-carrying telescoping tube structure 171.

Thus, it will be apparent that by proper control of the two rams 240, the tube structure 171 and the screed 32a carried thereby will be swung about the pivot 170. Furthermore, as previously indicated, this tube structure 171 will be supported and guided at its outer ends by the units 185 regardless of the lateral position of the trucks 35. Furthermore, because of the flexible drive connection 208, there will be no interference with the reciprocating or oscillating drive mechanism for the screed. Also, the screed will be backed-up at different positions along its length by the thrust rollers 195 regardless of the lateral adjustment of the trucks 35. Reciprocation of the screed will not be hampered by the screed suspending and elevating means due to the provision of the elongated rods 204 that cooperate with the rollers 203.

For providing hydraulic pressure for the various rams and hydraulic motors, a tandem hydraulic pump 250 is supported on the central fixed frame 30a, as shown in FIGURE 3a. This pump is driven by a suitable motor 251, also supported by frame section 30a, and this motor is preferably of the internal combustion type. A bank of control valves is provided in the hydraulic system and these valves are operated by means of control handles 252 disposed on a console 253 supported at the front of the frame section 30a.

The hydraulic system for operating the various hydraulic units is illustrated diagrammatically in FIGURE 21.

The pump 250 is a pump comprising annular units in tandem. It is provided with five pressure outlet lines 261, 262, 263, 264, and 265, connected to the respective units thereof, and with a common inlet line 266, which connects to the supply tank 267. The line 261 connects to one end of a group 268 of valves and a return line 269 connects to the other end of the group and to the tank 267.

Starting at the right hand side of the group of valves 268, it will be noted that the valve 271 controls through the lines 223 the hydraulic ram 225 that controls lifting of the screed 32a. This valve 271 is a four-way three-position valve and will be spring loaded to return to neutral but can be shifted in one direction to raise the screed and in the other direction to lower the screed. The valve 272 of this group will be of the same type, having a neutral position and operative positions on either side of neutral, being spring-returned to neutral. The valve 272 is connected by the lines 164 to the ram 160 for controlling the elevation of the conveyer unit 31. This valve can be moved from neutral into one position or the other to raise or lower the unit 31 which it controls. The valve 273 is similar and controls the pair of rams 240 which controls the pivoting of the diagonal screed. This valve is connected to the rams 240 by the lines 241. This valve will permit fluid to flow back and forth from the pressure sides of the two rams 240, the opposite sides of the rams being connected by a line 241a. Therefore, the valve 273 can be moved from neutral in either direction to change the angle of the screed 32a. The next valve 274 is connected by the lines 219 to the screed reciprocating motor 220. The next valve 275 is also connected to the motor 220. Between the valves 274 and 275, the pressure line 263 from the pump 250 is connected. The valves 274 and 275 are identical and each is a two-position, four-way valve. Each valve is a detent type and can be moved from neutral into detent position to drive the motor. The valves 274 and 275 are so connected in the system that valve 274 is for one speed, the valve 275 is for another speed, and the two valves operated together provide for a third faster speed. Thus, the screed 32a can be reciprocated at selected speeds.

One of the pressure lines 264 from the pump 250 runs to one end of a group of valves 276, the pressure line 262 connects to the group intermediate the ends thereof, and the remaining pressure line 265 connects to a flow direction valve 277. The valve 277 connects to an equalizer 278 and this equalizer connects to the two control valves 279 and 280, each of which is connected by the lines 116 to one of the reversible motors 115 which controls the drive for each conveyor screw 97. The valves 279 and 280 are of the same four-way, three-position type as the valve 274 and will have a neutral position, a detent forward position, and a detent reverse position. The two valves 279 and 280 are connected to a return line 281 which connects to the main return line 269. The valves 279 and 280 may be selectively actuated to drive either screw member 97 in a forward or reverse direction. Between the lines 265 and 281, an overload relief valve 283 is connected. The flow direction valve 277 connects to the other or pressure side of the valve 282. This valve 282 is connected to the reversible drive or tramming motors 60 and control such motors. The connection to the motors 60 is made through the lines 59, a line 285 connecting the valve 282 to the one line 59 and a line 288 connecting it to the other line 59, this latter line having a flow equalizer 287 connected therein. A valve 284 is connected to one line 59 by lines 286 and 289. A line 288 connects between the flow equalizer 287 and the valve 282 and a line 289 connects the valve 284 to the line 59 adjacent the equalizer. The valve 284 is a three-way, three-position, spring-centered valve used for steering and which can dump oil to the tank 267 from either side of the flow equalizer 287, thereby stalling the motor 60 at that side. Valves 291 and 292 are also provided and along with the valve 282 provide means for obtaining different driving speeds for the motors 60. The valves 291, 292 and 282 provide for first, second and third speeds, respectively, and are of the four-way, three-position type having neutral, detent forward, and detent reverse positions. Seven forward and seven reverse speeds can be obtained through the various combinations of these valves. The valves 291 and 292 are part of the group 276. This group has a return line 290 connecting to the line 269. It will be noted that the valve 291 connects to the equalizer 287 by the line 295 and that the valve 292 connects thereto by the line 296. The valves 293 and 294 control the rams 70 which expand and retract the frame of the truck unit 30. The valve 293 is connected by the lines 295 and 296 to the respective lines 76 and 77 which connect to the rams 70 at one side of the machine. The line 76 connects corresponding ends of these two rams and the line 77 connects the other corresponding ends. The valve 294 is connected by the lines 297 and 298 to the respective lines 76 and 77 of the pair of rams at the opposite side of the machine, the line 76 connecting the corresponding ends of that pair of rams and the line 77 connecting the other corresponding ends thereof. The valves 293 and 294 and are each of a four-way, three-position type, being spring loaded into neutral. Moved one way from neutral, each valve will extend the truck frame outwardly at one side and moved the other way, will retract it. The valves 293 and 294 can be actuated independently to expand or retract the truck frame at either side.

It will be apparent from the above that according to our invention we provide a concrete spreader which uses hydraulic power or equivalent fluid power for all its functions and adjustment. The spreader includes a supporting truck or frame unit adapted to move along laterally spaced side forms for spreading the concrete between the two points evenly and quickly at a desired level, either at the level of or below the level of the upper edges of the side forms. The truck frame is adjustable as to width and may be adjusted as the machine moves along the side forms in accordance with the variations in spacing of the side forms due to their divergence or convergence at bridge approaches, curves, etc. The spreader includes a conveyor extending across the front of the machine which is composed of two oppositely extending spreading screw members. Each screw member can be operated independently of the other and can be rotated in either direction. The screws are of telescopic structure so that they can be extended or retracted while being driven in accordance with the lateral extension or retraction of the truck frame. The screw conveyor is such that it can be adjusted to different levels relative to the forms, even above or below the top edges of the forms. The screw members are so driven that the vertical adjustment or the extension or retraction thereof will not interfere with the driving thereof. Associated with the screw conveyer is a strike-off structure which strikes off the spread material at the proper level, and which is so constructed that it will extend or retract in accordance with the corresponding action of the screw conveyor. Furthermore, the strike-off edge of the strike-off structure can be adjusted relative to the conveyor.

The machine is preferably equipped with a screed of the diagonal type which can be swung to different angles about a central pivot on the machine. This screed is supported and adjusted by structure which will not interfere with the adjustment of the truck frame and which is provided with means for supporting and backing-up the screed at varying positions along its length in accordance with the lateral adjustment of the frame. Furthermore, the screed preferably has longitudinally adjustable shoes on its ends.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A spreading machine for spreading paving material or the like deposited on a surface to be covered and through which the machine is adapted to advance comprising a truck unit having trucks at each side and a telescoping frame connected between said trucks for variations in the transverse spacing thereof, a conveyer spreading unit supported on the truck unit for spreading the material transversely of the machine, said conveyer spreading unit being of the screw type and having telescoping sections between outer supports for expansion and retraction of the conveyer transversely, said sections being exposed so that they will engage the material as the machine advances and will spread it laterally over said surface, means for connecting the units together for simultaneous expansion and retraction, and interfitting slide members and vertical guideways between said trucks and said outer supports which permit relative vertical movement and prevent relative transverse movement.

2. A spreading machine according to claim 1 including a hydraulic ram between the conveyer unit and the truck unit for raising or lowering the conveyer unit relative to the truck unit.

3. A spreading machine according to claim 2 including a hydraulic ram connected between the telescoping sections of the truck unit for expanding and retracting the unit.

4. A spreading machine according to claim 3 in which said trucks include wheels adapted to operate on side forms, and hydraulic driving motors mounted on said trucks and connected to said wheels.

5. A spreading machine according to claim 4 in which said screw conveyer comprises a pair of oppositely extending screw-spreading members, means for driving each of said members independently, said means comprising a hydraulic driving motor supported on said conveyer unit and connected to each of said screw members.

6. A spreading machine according to claim 1 in which said screw conveyer comprising a pair of oppositely extending screw spreading members, each of which is composed of telescoping sections, and independent driving means connected to one end of each of said screw spreading members.

7. A spreading machine according to claim 6 in which each of said screw spreading members comprises a hollow section of square cross section which receives a section of annular cross section, and bearing members having a square outer contour and fitting within the square hollow section and having an annular inner contour for receiving said annular section to prevent relative rotation but to permit axial telescopic adjustment of said sections.

8. A spreading machine according to claim 6 in which said conveyer unit includes a strike-off blade structure disposed behind said screw conveyer and comprising overlapping blade sections which are mounted on said unit for expansion and retraction with said telescoping screw conveyer sections.

9. A spreading machine according to claim 8 in which said conveyer unit includes vertically disposed plates at each end of the screw conveyer for limiting outward spreading of the material acted upon by the conveyer and which are adapted to be disposed within side forms at each side of the machine, said plates being vertically movable with the conveyer unit.

10. A spreading machine according to claim 9 in which each of said plates carries a relatively vertically movable shoe which engages the associated side form.

11. A spreading machine according to claim 9 in which the outer end of each screw member is supported by the adjacent material limiting plate and the outer end of each strike-off blade section is supported by the adjacent material limiting plate.

12. A machine according to claim 8 including a screed carried by said truck unit behind said strike-off blade structure and which is pivoted thereto for swinging movement about a vertical axis, said screed being carried by a telescoping support which has extensible and retractable sections connected to the respective trucks and carried by a central section, said central structure carrying a pivot structure for supporting said screed for swinging about said vertical axis.

13. A machine according to claim 12 in which said extensible and retractable sections of the screed support are connected to the respective trucks by bearing and guide structures, said bearing and guide structures supporting said support sections for arcuate swinging and being transversely movable with said trucks upon lateral adjustment thereof.

14. A machine according to claim 13 including means for moving said screed about its pivot axis and holding it in adjusted position, said means comprising a hydraulic ram mounted on said truck frame and connected to said screed.

References Cited in the file of this patent

UNITED STATES PATENTS

| | | |
|---|---|---|
| 1,070,156 | McFarland | Aug. 12, 1913 |
| 1,102,435 | Powers | July 7, 1914 |
| 1,662,257 | Valerio | Mar. 13, 1928 |
| 1,724,054 | Troyer | Aug. 13, 1929 |
| 2,054,263 | McCrery | Sept. 15, 1936 |
| 2,418,540 | Bressler | Apr. 8, 1947 |
| 2,681,231 | Kondracki | June 15, 1954 |
| 2,845,167 | Heiken | July 29, 1958 |
| 2,902,908 | Schiavi | Sept. 8, 1959 |
| 2,962,949 | O'Dea | Dec. 6, 1960 |

FOREIGN PATENTS

| | | |
|---|---|---|
| 668,907 | Great Britain | Mar. 26, 1952 |

OTHER REFERENCES

Construction Methods & Equipment Magazine, January 1954, pp. 116 and 118.